(12) United States Patent
Kespohl

(10) Patent No.: US 7,344,192 B2
(45) Date of Patent: Mar. 18, 2008

(54) CHILD CAR SEAT

(75) Inventor: Horst-Günther Kespohl, Aichelberg (DE)

(73) Assignee: Recaro GmbH & Co. KG, Kirchem/Teck (DE)

( * ) Notice: Subject to any disclaimer, the term of this patent is extended or adjusted under 35 U.S.C. 154(b) by 53 days.

(21) Appl. No.: 11/353,599

(22) Filed: Feb. 14, 2006

(65) Prior Publication Data
US 2006/0181125 A1    Aug. 17, 2006

(30) Foreign Application Priority Data
Feb. 16, 2005    (DE) .................. 10 2005 007 262

(51) Int. Cl.
*A47C 7/02* (2006.01)
*A47D 1/10* (2006.01)

(52) U.S. Cl. .................. 297/230.14; 297/256.1; 297/256.13; 297/250.1

(58) Field of Classification Search .......... 297/250.1, 297/230.14, 256.1, 256.13, 452.41, 452.42
See application file for complete search history.

(56) References Cited

U.S. PATENT DOCUMENTS

| 4,858,997 | A | * | 8/1989 | Shubin ................... 297/487 |
| 4,915,446 | A | * | 4/1990 | Darling et al. ........ 297/256.14 |
| 5,228,745 | A | * | 7/1993 | Hazel .................... 297/229 |
| 5,292,175 | A | * | 3/1994 | Artz ..................... 297/250.1 |
| 5,839,789 | A | * | 11/1998 | Koledin ................. 297/476 |
| 6,568,755 | B1 | * | 5/2003 | Groening ............... 297/256.13 |
| 6,739,659 | B2 | * | 5/2004 | Dukes ................... 297/256.13 |
| 6,773,065 | B1 | * | 8/2004 | Stamper ................ 297/256.12 |
| 6,808,232 | B2 | * | 10/2004 | Takizawa ............... 297/256.13 |
| 7,219,958 | B2 | * | 5/2007 | Yamazaki et al. ...... 297/256.13 |

FOREIGN PATENT DOCUMENTS

| DE | 31 37 923 | 8/1982 |
| DE | 10 2004 005 624 | 8/2005 |

* cited by examiner

*Primary Examiner*—David Dunn
*Assistant Examiner*—Sarah B McPartlin
(74) *Attorney, Agent, or Firm*—Pandiscio & Pandiscio

(57) ABSTRACT

The invention is directed to a child car seat, composed of a) a seat shell, comprising a bottom sitting region with at least one bottom stand surface to be stood on a seat of a vehicle, a backrest region extending upwardly from the sitting region and having at least one outer surface to be leaned against the backrest of the vehicle seat, and lateral surfaces, for example lateral armrests, shoulder supports and/or head supports, for limiting the lateral range of movement of a child, at least that portion of the backrest region that comprises a rear leaning surface being rigidly connected to the sitting region comprising a bottom stand surface, and b) a rather two-dimensional seat element, comprising a sitting surface and/or backrest that is/are disposed on the inner side, turned toward the child, of the seat shell and is/are adjustable with respect thereto in terms of inclination and position and is/are lockable in a plurality of different inclinations and/or positions by means of a manually operable device on the seat having a coupling to the adjustable, rather two-dimensional seat element on the one hand and to the seat shell on the other.

7 Claims, 2 Drawing Sheets

CHILD CAR SEAT

BACKGROUND OF THE INVENTION

1. Field of the Invention

The invention is directed to a child car seat, composed of, on the one hand, a seat shell comprising a lower sitting region with a bottom stand surface to be stood on a seat of a vehicle, a backrest region extending upwardly from the sitting region and having an outer surface to be leaned against the backrest of the vehicle seat, and lateral surfaces, for example lateral armrests, shoulder supports and/or head supports, for limiting the lateral range of movement of a child, at least that portion of the backrest region that comprises the rear leaning surface being rigidly connected to the sitting region comprising the bottom stand surface; and on the other hand, a seat element comprising a sitting surface and/or backrest that is/are disposed on the inner side, turned toward the child, of the seat shell and is/are adjustable with respect thereto in terms of inclination and/or position. The bottom stand surface can be configured as two-part or multi-part, for example by means of two lateral skids. Similar measures could also be implemented with the backward leaning surface. The seat element comprising a sitting surface and/or backrest extends preferably along a (curved) two-dimensional surface and is rather thin, for example only 0.1 to 4 cm thick, measured in a direction perpendicular to the sitting surface or to the backrest, respectively.

2. Description of the Prior Art

It is precisely on long trips that it is especially important to be able to adjust the inclination of a child seat, since many children have difficulty sleeping in the relatively upright sitting position and therefore desire a more inclined lying position. Various attempts have been undertaken to achieve such adjustability from a relatively upright sitting position to a more inclined lying position.

For example, the applicant's German Patent Application 10 2004 005 624 describes a child car seat which in order to be adjusted from an upright sitting position to an inclined lying position is moved as a whole with respect to the vehicle-inherent car seat concerned. The inclination of the child seat is adjusted for example by pivoting a plate downward from the seat bottom in the region of the front edge, causing the entire child seat to be shifted forward in its bottom region. This places additional stress on the vehicle-inherent belts used to fasten the child seat to the vehicle-inherent seat, by which the child seat can be cushioned in turn only if the surface regions of the belt guide slits on the child seat are elastically implemented and thus permit relative movement of the child seat with respect to the vehicle-inherent belt. However, on the whole this makes for a not inconsiderable structural expenditure that has a negative impact on the pricing of the prior-art seat.

German Unexamined Patent Application 31 37 923 A1 describes a child seat with a rigid seat shell; a wedge-shaped cushion and a pad can be placed in the seat in different positions, thereby changing its inner contour. In a more upright sitting position the child sits on the wedge-shaped cushion, while in a more inclined, lying position the child's legs are placed on the wedge-shaped cushion, which is shifted forward for the purpose. Such an arrangement has a great many disadvantages. For one thing, the movable elements—the wedge-shaped cushion and the pad—are fastened to the seat shell barely if at all, so an active child can independently bring these elements into the most varied positions, resulting in an uncomfortable seat geometry. Almost more detrimental, however, is the fact that for the child seat to be adjusted, the child first has to be lifted out of it to provide access to the wedge-shaped cushion and the pad and enable these elements to be rotated or shifted. It is therefore impossible to adjust the seat while the vehicle is in motion, but instead is first necessary to find a rest stop or at least a place to pull over, which can be a matter of some difficulty on the freeway.

SUMMARY OF THE INVENTION

These disadvantages of the described prior art have given rise to the problem initiating the invention, that of improving a child car seat of this kind in such fashion that it is possible with minimal structural expenditure to adjust the seat inclination without having to lift the child out of the seat for the purpose.

To solve this problem, the invention provides, in connection with a child car seat of this kind, a manually operable device on the seat, having a coupling to a movable seat portion on the one hand and to the seat shell on the other hand, for adjusting the inclination and/or position of the rather two-dimensional seat element and locking or securing same in a plurality of different inclinations and/or positions.

This creates the possibility of relative movement between the seat shell on the one hand and the sitting surface or backrest on the other, making it possible to adjust the inclination of the sitting surface and/or backrest without thereby changing the position of the seat shell with respect to the vehicle-inherent seat. For this reason, such a child seat is suitable for any type of attachment to a vehicle-inherent seat—both using a vehicle-inherent belt and by means of so-called ISOFIX tabs, which can be latched in anchor points provided for this purpose in the region of the vehicle seat. The latter is of interest primarily because if a total of four mounting tabs is provided—two on the front of the seat and two on the back—the child seat can be mounted on the vehicle-inherent ISOFIX anchorages alternatively either in the direction of travel or opposite the direction of travel, as is mandatory for example in Sweden for children weighing up to 18 kg. Because the seat shall has a sitting-surface region, a backrest region and lateral bounds, for example armrests and/or lateral head supports, from a purely external standpoint it conforms to the usual construction of a child seat in which the sitting-surface region and backrest regions serve primarily to support the seat on a vehicle-inherent seat and to provide anchor points or bearing or guide points for the moving parts of the seat. On the other hand, it is not necessary for the armrests and/or lateral head supports to be carried along as the inclination is adjusted, so to increase stability these elements are connected to the body of the seat shell. Since the outer seat shell per se is rigidly implemented, the child seat as a whole is imparted the necessary stiffness to hold the moving parts of the seat, and also, in particular, a child located in the seat, securely in place despite any increased accelerative or decelerative or lateral forces. A manually operable adjusting device for adjusting the inclination is provided on the seat. Its function is, by virtue of being coupled to a moving part of the seat on the one hand and to the seat shell on the other, to exert an effect on the relative position of the two; moreover, the adjusting device should be capable of locking a relative position once said position has been set, preferably in such fashion that no automatic adjustment of any kind can occur even under strong accelerative or decelerative forces. This can be achieved for example by means of a stop mechanism which at certain relative positions creates a form-locking connection that cannot be broken without releasing the stop element concerned. Also conceivable, however, is a clamping and/or self-locking mechanism that can be actuated in arbitrary intermediate positions of the movable seat element. With such an adjusting device, the necessary manipulations are reduced to such an extent that adjustment is possible even when the vehicle is in motion.

The seat shell is preferably provided with devices for fixing the inventive child seat to a vehicle-inherent seat. These can be, on the one hand, guiding devices, for example slits, clamping and/or tensioning devices for a vehicle-inherent belt, and/or yoke- or tab-like ISOFIX fasteners, which in vehicles specially equipped with systems of this kind can be suspended from or latched into anchoring points on a seat or on the body of the vehicle.

For the purpose of anchorage to a vehicle-inherent belt, the backrest section of the outer seat shell can be divided into a front and a back portion that are movable relative to each other, for example pivotable about a common joint in the pelvic region, specifically about an axis of rotation extending transversely to the sitting or driving direction. Whereas the back portion stays in contact with the backrest of the vehicle seat, the front portion, by contrast, can be pivoted forward. This creates between these two portions a roughly wedge-shaped gap through which a vehicle-inherent three-point belt can be threaded. When this three-point belt is pulled taut, the front portion of the backrest of the seat shell is pivoted backward again and is latched there, for example by means of a left and a right lug, thus clamping the three-point belt securely in place. If the lateral head, shoulder and/or chest supports are fastened to the forwardly pivotable portion of the backrest of the outer seat shell, they must accompany the pivoting motion. To keep their movement in such cases from being impeded by the lateral armrests, they do not extend down as far as the armrests. The gap created in this way leaves them enough clearance to pivot. If, on the other hand, the adjustable backrest portion is mounted on the pivotable portion of the backrest of the outer seat shell, this adjustable sitting-surface portion must also pivot forward. To permit this, the invention recommends that the pivot axis extending transversely to the sitting or driving direction between the two backrest portions of the seat shell be located roughly in common alignment with an axis of motion of a joint or hinge region between a backrest section and a sitting-surface section of the collectively adjustable seat element.

According to an improvement of the invention, the adjusting device for adjusting at least one two-dimensional seat element with respect to the seat shell is configured such that when a relative adjustment is made between the seat element and the seat shell, the latter executes no relative movement with respect to the vehicle-inherent seat. This is achieved in particular by the fact that neither on the seat bottom nor on the seat back, i.e. the backrest, do the adjustable seat portions protrude downward or backward toward the seat shell. Moreover, the inventive child seat is preferably closed off at the sides by the arm and head supports affixed to the shell, so that the range of movement accorded the movable portions of the seat by the bearing and/or guiding elements is limited to, at most, the upper and front sides facing away from a vehicle-inherent seat, i.e. upward and/or forward movement, depending on the type of displacement.

Within the context of a first embodiment of the invention, it can be provided that a seat element is pivotable with respect to the seat shell. Particularly suitable for the application of this principle is the backrest, whose inclination has a definitive effect on the sitting or lying position of a child, whereas the sitting surface, by contrast, need not change substantially with respect to its spatial orientation. A comparable case is the adjustability of a recliner for adults, where pivoting the backrest downward also adjusts the seat. In contrast to such a recliner, however, in the case of the inventive child seat the pivot axis for the backrest preferably does not lie in the region of the pelvis, but rather in the region of the head of a child located in the seat.

Another adjustment possibility is for a seat element to be displaceable with respect to the seat shell. This means primarily, although not exclusively, displacement roughly parallel to the base of the seat element concerned. This adjustment possibility has proven effective above all in connection with the sitting-surface element, since it is thereby possible to adjust the inclination of the backrest while shifting the lumbar spinal region forward.

Having a rather two-dimensional seat element be bearing-mounted and/or guided on the seat shell in the region of the top edge of its backrest creates an anchor point where the forces acting on a movable seat element can be diverted to the seat shell. At the same time, the range of movement of the backrest at this location is limited to a (preferably roughly vertical) displacing movement and/or to a pivoting movement about an axis (preferably extending transversely to the direction of travel). The bearings or guides are preferably disposed on both sides of the seat symmetrically to each other, i.e. in pairs.

In similar fashion, an additional anchorage and limit for the range of movement of the sitting-surface element is provided by at least one (additional) bearing and/or guide point for a rather two-dimensional seat element in the lower sitting region, preferably in the front region of the seat shell, particularly at the front edge of the sitting surface. The bearings or guides are preferably disposed symmetrically to each other, i.e. in pairs, on both sides of the seat, or as a common guide in the center of the seat. It has proven especially effective for each side of the inner face of the seat shell to be provided, roughly below each lateral armrest, with a coulisse, i.e. a groove tracing a defined path, in which a respective lateral prolongation provided on the lower section of the adjustable seat element can engage. Such a coulisse preferably has an upper portion that extends roughly in the sitting or driving direction and makes it possible to pull the lower portion of the sitting-surface element forward into the lying position. If mere pivot bearings are provided in the upper region of the backrest, then the sitting surface rises during its forwardly directed displacing movement, due to the circular motion thereby imposed on the backrest section in the rearward pelvic region. The result would be a downward tilt of the front edge of the sitting surface; to prevent this, the longitudinal portion of each coulisse, running approximately in the sitting direction, can extend slightly upward from back to front, for example at an angle of about 5° to 15°, so that the orientation of the sitting surface in space always remains roughly constant, i.e. roughly horizontal. A plurality of short coulisse portions branch off downwardly from the upper longitudinal portion of each coulisse and can be engaged by the lateral prolongations of the adjustable sitting surface. When a child sits on the inventive seat, his or her weight presses the lateral prolongations firmly into the chosen vertical portions of the coulisses, preventing the inner portion of the seat from adjusting on its own. Adjustment is possible only when the sitting surface is lifted by an adult until the lateral prolongations are at the level of the upper longitudinal portions of the coulisses and can be slid therein—either in the sitting direction or opposite thereto—to another vertical portion, where locking can again take place. Two or more vertical portions can be provided for each coulisse.

By virtue of the adjustable, rather two-dimensional seat element comprising both a sitting surface and a backrest, an integral structural element is obtained, with the advantage that the sitting-surface and backrest portions stabilize each other. Thus, apart from the above-cited two bearing and/or guide points or pairs of points, no further connection to the seat shell may be necessary.

If relative movement is possible between the sitting-surface region and the backrest region of a collectively adjustable rather two-dimensional seat element, then during a tilt adjustment these elements can follow different paths of motion, thus enabling such a child seat to have a space-saving overall design. In this case, the two oppositely movable regions—the sitting-surface region on the one hand and the backrest region on the other—should be much more rigid than in the softer pelvic region, so that the child can gain adequate support from these members. It is thereby unnecessary for the rather two-dimensional seat element to be supported on the seat shell over a large area, as in DE 31 37 923 A1, but instead it can be raised or shifted forward; this last ensures in turn that the rather two-dimensional seat element will not be hindered in its adjusting movement by the seat shell. The soft pelvic region can be implemented for example as a film hinge or with its own hinge or joint element.

The invention can be improved by causing a rather two-dimensional element to be inherently movable, for example via one or more hinges or film hinges.

Taking this inventive idea farther, it can further be provided that at least one rather two-dimensional element comprises predetermined break points that break to protect the child when certain deceleration values are exceeded.

An adjustable seat portion is further lent a certain elasticity by comprising a rather two-dimensional element made of a (to a limited extent) flexible material, for example a rather two-dimensional plastic or a fabric or a braid. By virtue of such elasticity, the seat portion can adapt to the shape of a child and is felt by the child to be comfortable. Any additional adjusting device for adjusting the seat to the size of a growing child is therefore superfluous. Moreover, the weight of the child seat can also be minimized in this way. Finally, the child seat can yield under local overstresses, for example on a sudden deceleration of the vehicle, so that the decelerative forces acting on the child cannot become too great.

If a rather two-dimensional element comprises one or more air chambers or other type of cushioning, for example a foam layer, this also produces an elasticity that then makes it possible to use a relatively rigid material as the substrate.

The invention also affords the option of back-ventilation in the region of at least one rather two-dimensional element. On the one hand, this can keep the child from perspiring, to prevent heat buildup; on the other hand, any sweat that is nevertheless exuded is able to dry quickly, so that a rather two-dimensional element, regardless of any fabric of which it may be made, does not grow damp in the course of a relatively long trip and instead always feels comfortably dry.

Of not inconsiderable importance to the stability of the inventive seat is to reinforce an adjustable seat portion with ribs that extend around it at least regionally, or even a frame. This enables (weight) forces that are exerted areally on the movable portion of the seat to be collected along certain lines and passed on—optionally via the edge of the seat—to attachment points, particularly bearing and/or guide points, thus preventing local overstressing of a rather two-dimensional seat portion. Such stiffening ribs or frames are preferably disposed on the bottom or back side, facing away from the child, of a rather two-dimensional seat element. Stiffening ribs are preferably made of plastic and integrated with the seat element concerned; a frame can be implemented for example in the form of tubing, since a tube has an optimum stability-to-weight ratio.

A rather two-dimensional element of an adjustable seat portion can be suspended from or within such a frame, preferably via elastic or resilient elements, thereby producing cushioning like that provided by a well-padded car seat, particularly during high-speed and/or curve-intensive driving, but also during sudden accelerations, for example when joining traffic. Another type of padding consists in the use of elastic inserts, for example of styrofoam, which are able to deflect to a greater extent during a collision than a seating element stiffened with ribs. Such elastic inserts can preferably be disposed in the region of the head, specifically both on the adjustable backrest region and on the lateral head supports connected to the seat shell.

A belt intended for a child and inherent in the child seat, for example a suspender belt, should be guided and/or anchored on an adjustable seat element so that it is not necessary to readjust such a belt when adjusting the inclination of the child seat. In the case of anchorage to a movable seat portion, it is preferable to use a sturdy frame thereof for this purpose. However, the path of the belt can also be configured in such a way that the length of the belt always remains the same regardless of the tilt of the seat. In such cases the belt can be anchored to the seat shell, whereas the belt is redirected or guided only once in the region of the adjustable seat element. For this purpose, perforations, through each of which a respective segment of the belt can be passed, can be provided for example in the shoulder or head region of the adjustable backrest. These perforations can be roughly vertically extending longitudinal slits, thereby permitting adjustment to children of different sizes. There is also preferably a front belt segment that passes between the child's legs and thereby reliably prevents him or her from slipping downward out of the belt.

Such a front belt segment is preferably anchored to the seat shell, particularly to its underside, and can extend for this purpose through a recess in the adjustable seat element. According to the inventive principle, it is even possible with little expenditure to create a five-point belt by providing, in addition to the two shoulder belts and the leg belt, two pelvic belt segments that preferably pass laterally between the adjustable sitting-surface element and an armrest of the seat shell and are anchored to the latter on the left and the right. Five-point belts have already proven effective for children in the age range of 9 months to 3½ years, since children of these age brackets often try to slip out of shoulder belts.

It is further within the teaching of the invention that the belt inherent in the child seat comprise a belt buckle and optionally a length-adjusting device and/or an (automatic) belt-tensioning means. The safety and reliability of the belt has highest priority in the design of such elements, while the greatest possible ease of operation must be considered a secondary requirement. In a five-point belt system, all five belt segments converge in a star shape at such a belt buckle, which is preferably fixedly connected to the frontward, centrally extending segment of the belt, while the other four belt segments are each provided with a buckle tongue for insertion in the belt buckle.

Finally, in the context of a preferred implementation, a manual operating element for the adjusting device is disposed on the outside of the seat shell, for example on the front or side, and is configured for example as a grip, lever or handwheel. The latter permits infinitely variable adjustment, even when the vehicle is in motion, if necessary. If the manual operating element is disposed on the front of the seat, then it can be configured for example as a handle cup or handle cutout in the movable seat element, by means of which said seat element can be lifted out of an anchoring means so that it can be adjusted in the direction of travel; on being lowered, it then latches back in the modified position and is thereby locked in place.

BRIEF DESCRIPTION OF THE DRAWINGS

Additional features, characteristics, advantages and effects based on the invention will become apparent from the following description of preferred embodiments thereof and an examination of the drawing. Therein.

DESCRIPTION OF THE PREFERRED EMBODIMENT

Figure 1:
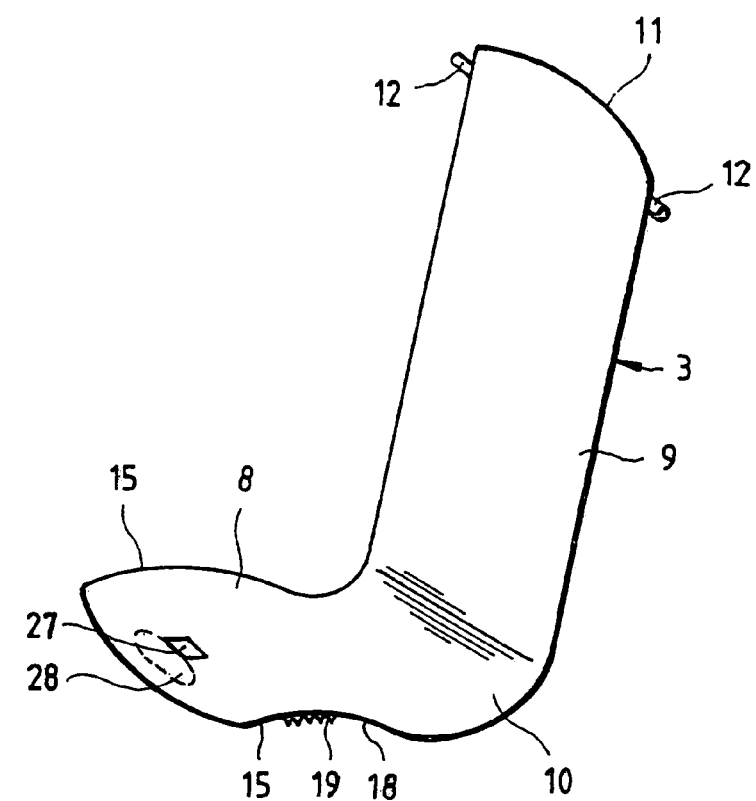
FIG. 1 shows a first embodiment of the invention in a perspective exploded diagram.
Figure 1:
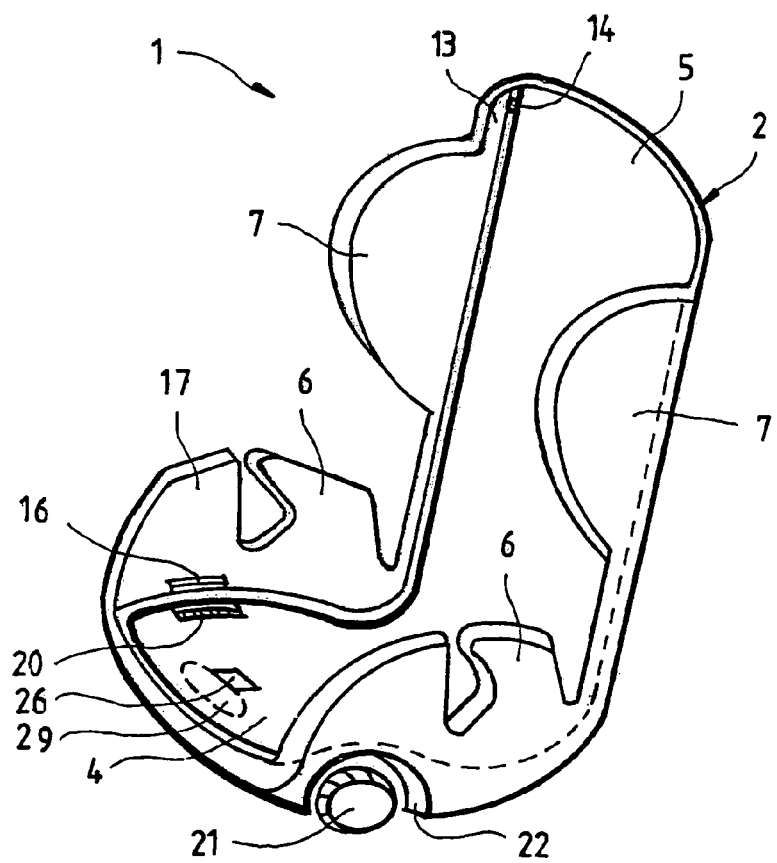

The child car seat 1 of FIG. 1 is basically composed of two parts: a seat shell 2 and an insert 3 movably received therein.

The seat shell 2 roughly corresponds in its outer dimensions to an ordinary commercial child car seat. It comprises a sitting-surface region 4, a backrest region 5, two armrests 6 and two lateral head supports 7. In contrast to the case with an ordinary commercial child car seat, however, neither sitting-surface region 4 nor backrest region 5 is designed for direct use; in particular, they are not padded in any way.

Provided instead is the insert 3, a planar part having a curved profile roughly corresponding to a roughly horizontal sitting surface 8 and a roughly vertical backrest 9. The transitional region 10 between the two sections 8, 9 can be gently curved. The insert 3 is shaped with respect to both its circumference and its curvature such that it conforms as exactly as possible to the sitting-surface and backrest regions 4, 5 of the seat shell 2; for example, the width can be roughly equal to or minimally smaller than the clearance between the two armrests 6 and/or between the two lateral head supports 7.

In the region of the top edge 11 of backrest 9, the insert comprises two lateral, mutually aligned, pin-like prolongations 12. Provided at the corresponding locations on backrest region 5, each in a respective forwardly protruding projection of backrest 5, for example in a head support 7 or in an extension 13 roughly aligned therewith, are bearings 14 for rotatably receiving each a respective pin 12, particularly in the form of blind holes whose insertion direction extends transversely to the sitting direction. Insert 3 is suspended from seat shell 2 at these locations.

On the other hand, the lateral edges 15 of sitting surface 8 are each overlapped by an inwardly projecting bulge 16 on the inner face 17 of each of the two armrests 6 and are thereby held so as to be immovable vertically, whereas the sitting surface 8 can be shifted in approximately the sitting direction.

Furthermore, two rows of teeth 19 extend along the underside 18 of sitting surface 8 of insert 3, each running along one of the two lateral edges 15 thereof. Provided at each of the relevant locations in the sitting-surface region 4 of seat shell 2 is a slot-shaped indentation or recess 20, in which is seated a respective toothed wheel. Both of said toothed wheels are disposed on a common shaft that extends transversely to the sitting direction within or under sitting-surface region 4 and can for example be bearing-mounted in the region of the two armrests 6. On at least one side of seat shell 2, this shaft is extended outwardly and provided with a handwheel 21 for manual operation. The handwheel 21 can be disposed for example in a trough-shaped recess 22 in the region of an armrest 6. Since the rows of teeth 19 each mesh with a respective one of the two toothed wheels rigidly affixed to the rotating shaft, by turning handwheel 21 and by the agency of the row of teeth 19, the sitting surface 8 of the insert is moved forward in the sitting direction or back oppositely to the sitting direction.

Figure 2:
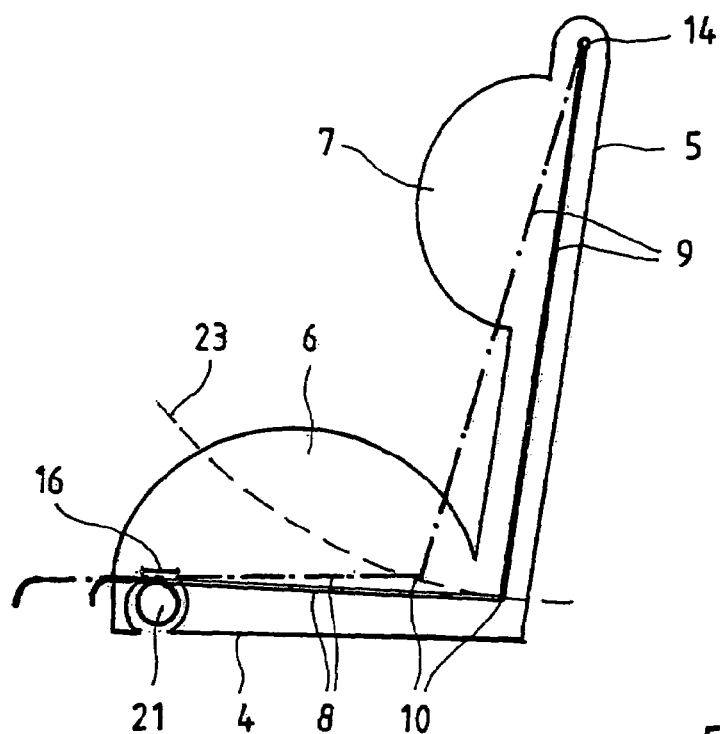
FIG. 2 is a schematic section through FIG. 1 along a central vertical plane of symmetry.

The manner of operation of this mechanism is illustrated in FIG. 2.

Insert 3 is initially in the upright sitting position identified by thick lines, backrest 9 being roughly aligned with the backrest region 5 of seat shell 2.

If handwheel 21 in FIG. 2 is now turned counterclockwise, sitting surface 8 is moved forward into the position represented by dotted and dashed lines. Since, by the same token, backrest 9 of insert 3 executes an exclusively pivoting movement about rotating shaft 14 in the region of the top edge 11 of the backrest, the transitional region 10 between backrest 9 and sitting surface 8 also moves in a circular path 23.

Since this movement curve corresponds only approximately to the nearly rectilinear movement of sitting surface 8, the angle between sitting surface 8 and backrest 9 must change whenever the inclination of the seat is adjusted. This is made possible by a bending property of the planar material of insert 3 in transitional region 10. The angle by which the inclination of sitting surface 8 changes in the process can be neglected.

Figure 3:
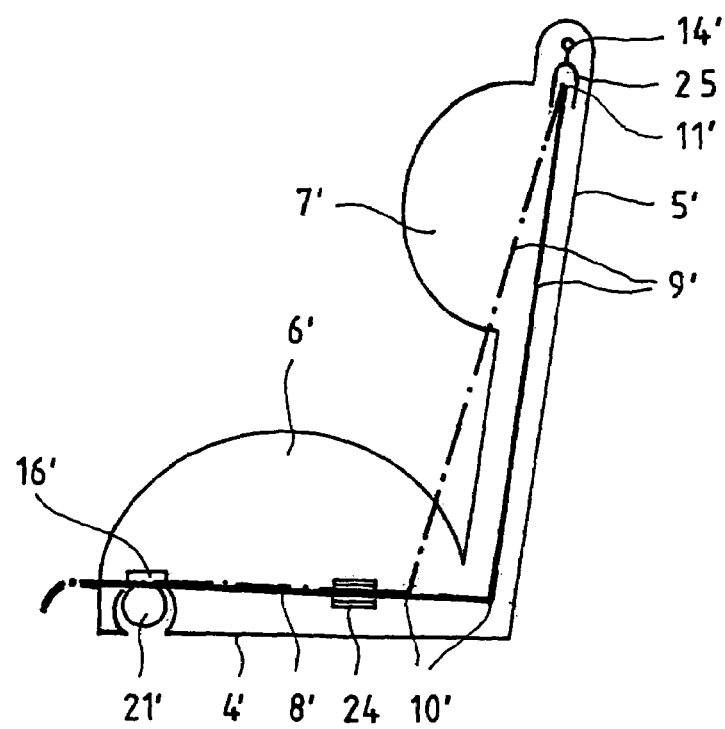
FIG. 3 is a diagram of an embodiment of the invention modified with respect to FIG. 2.

The manner of operation of the mechanism of seat 1' depicted in FIG. 3 differs slightly from the foregoing.

Here, in addition to the guides 16' for sitting surface 8' in the region of handwheel 21', additional guide means are also provided in the rearward area of seat 1'. Like the guides 16', these can also be configured as inwardly projecting bulges 24 above sitting-surface region 4'. These additional guides 24 ensure that during each adjustment, sitting surface 8' displaces in a plane, which plane can also be curved analogously to curved sitting surface 8 of FIG. 1. In the latter case, this displacement would actually again correspond to a rotation roughly about the (imaginary) center axis of a cylinder whose superficies roughly coincides with sitting surface 8.

In any case, the movement of sitting surface 8' or its orientation in space is exactly defined, and this, via the transitional region, also affects the backrest 9', which can be shifted forward in its lower region into the lying position illustrated by the dotted and dashed line in FIG. 3. To compensate, an additional degree of freedom of movement must be provided in the region of the top edge 11' of backrest 9'. For this reason, backrest 9' is not carried directly by bearing points 14', but is guided so as to be displaceable in its longitudinal direction, for example along guide rails 25 parallel to the vertical plane of symmetry of seat 1.

Common to both embodiments is the fact that the angle of inclination of backrest 9, 9' changes to a greater extent than the angle of inclination of sitting surface 8,8'. Since this has no effect on the seat shell 2, the latter can even be anchored using ISOFIX technology, which has the advantage that such a seat 1 can also be operated oppositely to the direction of travel.

Also visible in FIG. 1 is a central adjusting button 26 located on the upper face of sitting-surface region 4 of seat shell 2, near the front edge of the seat, and by the operation of which for example the length of the seat-inherent belt can be adjusted. This central adjusting button 26 conforms to a mating recess 27 in movable insert 3, which releases central adjusting button 26 for operation particularly when insert 3 is in its initial vertical position.

In a modified embodiment, disposed in the region of this recess 27 of insert 3 is a perforation in the form of a slit 28 oriented transversely to the sitting direction and shaped so that the fingers of a hand can comfortably reach through it. In addition, in this embodiment, instead of the lateral rows of teeth 19, the underside 18 of sitting surface 8 of insert 3 can be provided with a single, central row of teeth that are in mesh with a roughly vertically upward-projecting latching element, for example a tooth-shaped such element, on the sitting-surface region 4 of seat shell 2, and thus prevent insert 3 from shifting until insert 3 is lifted at grip 28. This disengages the form-lock between the row of teeth of insert 3 and the latch element of seat shell 2; insert 3 can be adjusted in or against the sitting direction; and by virtue of the user then letting go of the grip 28, sitting surface 8 of insert 3 drops back down again and thereby latches in the new position. A recess or trough 29 beneath grip recess 28 makes it easier to grasp and reach around grip edge 28.

What is claimed is:

1. A child car seat (1;1') comprising: a seat shell (2;2'), comprising a lower sitting portion (4;4') with a substantially uninterrupted shell bottom surface adapted to be placed on a seat of a vehicle, and a substantially uninterrupted shell backrest (5;5') extending upwardly from said shell lower sitting portion (4;4') the shell backrest being adapted to be leaned against a backrest of the vehicle seat, and armrests (6;6'), shoulder and head supports (7;7') integral with and extending from the seat shell for limiting a lateral range of movement of a child, at least a portion of said shell backrest (5;5') comprises a rear leaning surface rigidly extending from said shell lower sitting portion (4;4'), wherein the lower sitting portion (4;4') as well as the shell backrest (5;5') are not padded in any way; and an insert (3,8,9;8',9') comprising both a sitting surface (8;8') and backrest (9;9'), which are disposed on an inner side of said seat shell (2;2') and are adjustable with respect thereto in terms of their inclination and position, said insert being a continuous generally planar part of bendable material, whereby a relative movement is possible between said insert sitting surface (8;8'), and said insert backrest (9;9'); and a manually operable device (19-21;19'-21') on the seat, coupled to the insert (3,8,9;3',8',9') on the one hand and to said seat shell (2;2') on the other hand, for adjusting inclination and position of said insert (3,8,9;3',8',9') and for securing same in a selected one of a plurality of different inclinations and positions.

2. The child car seat in accordance with claim 1, wherein said insert (3,8,9;8',9') is adjustable with respect to said seat shell such that upon a relative adjustment between said insert (3,8,9;8',9') and said seat shell, said seat shell executes no relative movement with respect to the vehicle seat.

3. The child car seat in accordance with claim 1, wherein said insert (3,8,9;8',9') is displaceable with respect to said seat shell (2;2').

4. The child car seat in accordance with claim 1, wherein said insert (3,8,9;3',8',9') is bearing-mounted (13,14;13',14') on said seat shell in a region of a top edge of the insert backrest.

5. The child car seat in accordance with claim 1, wherein said insert (3,8,9;8',9') is bearing-mounted on said sitting portion (4;4') of said seat shell in a front region thereof.

6. The child car seat in accordance with claim 1, wherein said device (19-21;19'-21') for adjusting the inclination and position of said insert (3,8,9;8', 9') comprises an operating element disposed in a region of a front of the lower sitting portion of the seat shell.

7. The child car seat in accordance with claim 1, wherein said device (19-21;19'-21') for securing said insert (3,8,9;8', 9') comprises lockingly meshing elements, disposed on said sitting surface of said insert (3) and on said seat shell lower sitting portion.

* * * * *